United States Patent [19]
MacMillan

[11] 3,815,776
[45] June 11, 1974

[54] GAS CAP ASSEMBLY
[75] Inventor: Robert E. MacMillan, Allentown, Pa.
[73] Assignee: McCord Corporation, Detroit, Mich.
[22] Filed: June 26, 1972
[21] Appl. No.: 266,106

[52] U.S. Cl. .............................. 220/39 R, 220/44 R
[51] Int. Cl. ............................................ B65d 41/04
[58] Field of Search .......... 220/39 R, 44 R, 249 TC, 220/44 A; 215/43 R, 49

[56] References Cited
UNITED STATES PATENTS
3,616,960  11/1971  Miller ................................ 220/39 R
3,666,137  5/1972   Blau ................................. 220/39 R
3,715,075  2/1973   Blau ................................. 220/39 R Primary Examiner—George T. Hall
Attorney, Agent, or Firm—McGlynn and Milton

[57] ABSTRACT
A gas cap assembly is provided for the filler tube of a vehicle gas tank including a clutch coupling a closure member with a manually graspable control member. A plurality of radially deflectable pawls integral with the closure member and a plurality of protrusions, having surfaces engagable with the pawls, integral with the control member coact in the operation of the clutch. When the cap assembly is screwed onto the filler tube, the radially deflectable pawls are intermittently deflected to allow 360° relative rotation between the closure member and the control member, if the torque applied to the control member exceeds a predetermined maximum. In this manner, the torque that can be applied to tighten the closure member in the filler tube is limited to the predetermined maximum. When the cap is removed from the filler tube, the pawls engage the surfaces of the protrusions in a manner preventing relative rotation between the closure member and the control member irrespective of the torque applied to the control member; the pawls of the clutch are not deflected by the protrusions when the cap is removed. The cap assembly also includes two valves. An air inlet valve permits air to enter the gas tank as gas is pumped out. A pressure release valve insures against excessive pressure build-up in the tank.

20 Claims, 3 Drawing Figures

PATENTED JUN 11 1974
3,815,776
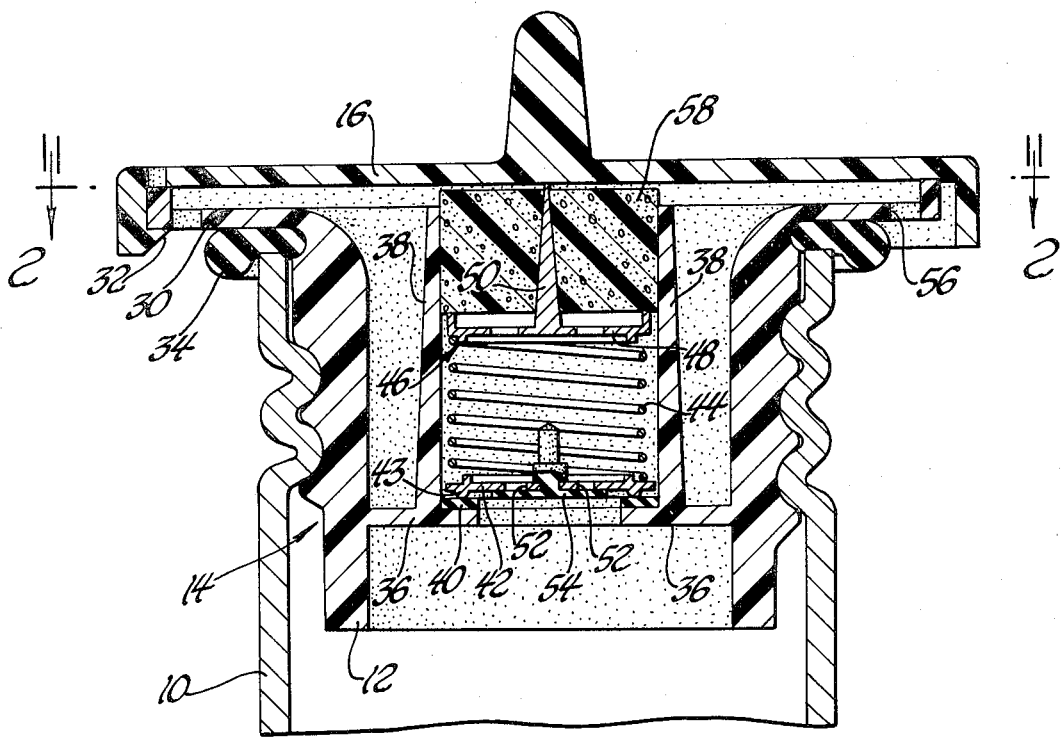
Fig. 1
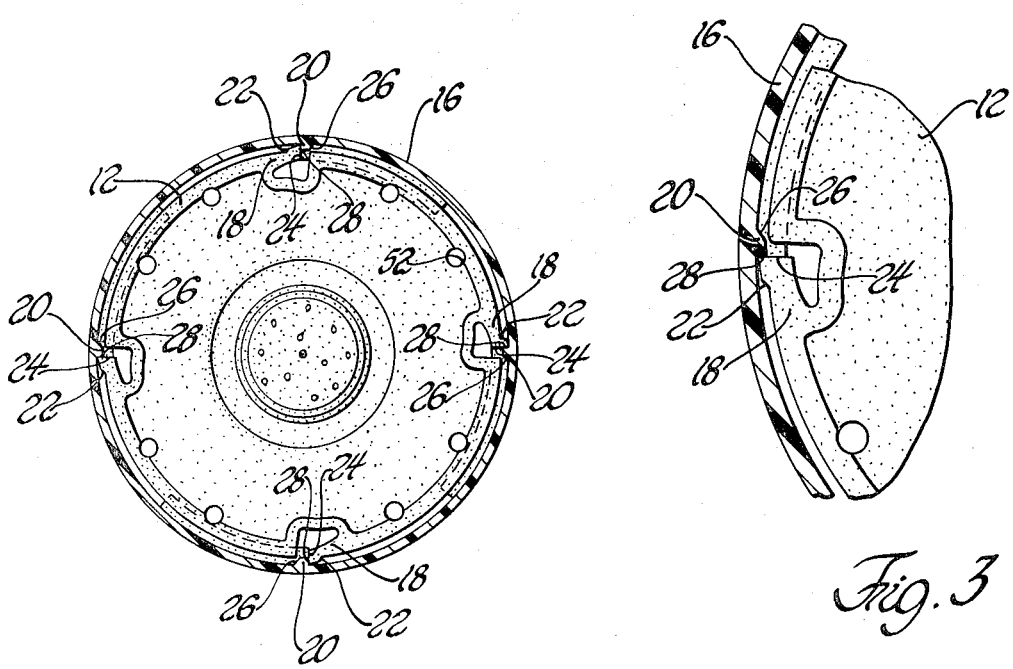
Fig. 2
Fig. 3

GAS CAP ASSEMBLY

This invention relates to a cap assembly suitable to cap the filler tube of a vehicle gas tank.

Fuel is typically pumped into the gas tank of a vehicle through a filler tube. It is necessary to cap the filler tube during normal vehicle operation. If the tube is not capped, gasoline will splash up the tube and out of the tank. Additionally, there is substantial evaporation if the filler tube is not capped. In fact, to minimize evaporation, it is not only necessary to cap the filler tube, it is also necessary to provide a seal between the filler tube and the cap.

One prior art gas cap assembly providing a seal between filler tube and cap includes a closure member and a manually graspable control member coupled together by a clutch. The clutch includes an intermediate torque transmitting member and a coil spring biasing the torque transmitting member such that the torque transmitting member normally interlocks for rotation the closure member and the control member of the cap assembly. When the control member is rotated in a direction to tighten the cap assembly onto the filler tube, the torque transmitting member engages a slot in the control member along inclined surfaces of the torque transmitting member. Accordingly, when the torque applied to the control member exceeds a predetermined level, the coil spring is compressed as the lines of contact between the inclined surfaces of the torque transmitting member and the slot of the control member shift. If the torque exceeds a predetermined maximum, the torque transmitting member disengages the slot of the control member and the control member rotates relative to the closure member. When the cap assembly is removed from the filler tube, the torque transmitting member engages the control member at surfaces that are not inclined relative to the slot of the control member. Accordingly, the clutch does not slip when a predetermined maximum torque is attained, and the torque applied to remove the cap assembly is not limited by the clutch.

The cap assembly of the present invention, like the prior art, includes a manually graspable control member and a closure member. In contrast to the prior art, however, the present invention includes a clutch having first and second coacting means integral respectively with the control member and the closure member. The present invention includes neither a coil spring nor a torque transmitting member in its clutch mechanism: in the present invention, the elements of the clutch are integral with the closure and control members of the cap assembly, the clutch elements are not separate as in the prior art. Accordingly, in the present invention, the control member directly engages the closure member when the cap assembly is screwed onto and off of the filler tube, whereas in the prior art an intermediate torque transmitting member couples torque from the control member to the closure member.

The cap assembly of the present invention, unlike the prior art, also includes two valves. An inlet valve passes air from the atmosphere to the gas tank as gasoline is pumped from the tank. A pressure release valve ensures against excessive pressure build-up inside the tank; the pressure release valve relieves pressure inside the tank when that pressure exceeds a predetermined maximum.

It is an object of the present invention to provide a cap assembly including a closure member having a threaded portion for engaging a threaded opening, a manually graspable control member, and a clutch having first and second coacting means integral respectively with the closure member and the control member wherein the clutch limits the torque transferred from the control member to the closure member when the control member is rotated in a first direction without limiting the torque transferred from the control member to the closure member when the control member is rotated in a direction opposite to the first direction.

It is another object of the present invention to provide a cap assembly including a closure member having a threaded portion for engaging a threaded opening, a manually graspable control member, and a clutch comprising a pawl and surfaces engagable with the pawl to transmit torque from the control member to the closure member.

It is another object of the present invention to provide a cap assembly including a closure member having a threaded portion for engaging a threaded opening, a manually graspable control member, and a clutch comprising a plurality of pawls integral with the closure member and a plurality of protrusions, integral with the control member, having surfaces respectively engagable with the pawls to transmit torque from the control member to the closure member.

It is another object of the present invention to provide a cap assembly for the filler tube of a vehicle gas tank as described wherein a seal is carried by the closure member and positioned to provide a seal between the closure member and the filler tube when the cap assembly is screwed onto the filler tube.

It is another object of the present invention to provide a cap assembly for the filler tube of a vehicle gas tank as described including valve means.

It is another object of the present invention to provide a cap assembly for the filler tube of a vehicle gas tank as described including air inlet and pressure release valves.

The instant invention, together with further objects and advantages thereof, can be best understood by reference to the following description of the preferred embodiment taken in connection with the accompanying drawings, in which:

FIG. 1 is a sectioned view of the cap assembly;

FIG. 2 is a sectioned plan view of the cap assembly showing detail of the clutch; and FIG. 3 is an enlarged sectioned view showing the cooperation of the elements of the cap assembly in the operation of the clutch.

Reference should now be made to the drawings and in particular to FIG. 1 wherein the cap assembly of the present invention is shown attached to a filler tube 10 of a gas tank (not illustrated). In the cap assembly, a closure member 12 has a threaded portion generally designated 14 for threadedly engaging the threaded opening in the filler tube 10. A manually graspable control member 16 is coupled to the closure member 12 by a clutch having first and second coacting means integral respectively with the closure member 12 and the control member 16. In operation, the clutch allows 360° relative rotation between the members 12 and 16 in one direction in response to a predetermined torque yet prevents relative rotation in the opposite direction.

Accordingly, when the cap assembly is screwed into the filler tube, the clutch limits the torque that can be transmitted from the control member 16 to the closure member 12 to thereby limit the maximum tightening torque that can be applied to the closure member 12; on the other hand, when the cap assembly is removed from the filler tube, the clutch does not limit the torque that is transmitted from the control member 16 to the closure member 12.

The first and second coacting means of the clutch of the cap assembly of FIG. 1 comprise respectively at least one radially deflectable pawl and at least one protrusion having surfaces engagable with the pawl. At least one of the first and second means of the clutch includes a ramp effective to radially deflect the pawl in response to the predetermined maximum torque when the cap assembly is screwed into the filler tube. As shown in FIG. 2, the first and second coacting means of the clutch comprise respectively a plurality of radially deflectable pawls 18 spaced circumferentially about and integral with the closure member 12 and a plurality of protusions 20 spaced circumferentially about and integral with the control member 16. Each of the pawls 18 is a cantilever disposed generally circumferentially about the closure member 12. Each of the pawls 18 has a ramp 22 extending inwardly from its outer circumferential extremity and a radial surface 24, also extending inwardly from the outer circumferential extremity of the pawl. Each protrusion 20 includes a ramp 26 disposed to selectively coact with the ramps 22 of the pawls 18 and a radial surface 28 disposed to selectively coact with the radial surfaces 24 of the pawls 18.

The operation of the clutch is best illustrated in the enlarged sectioned view of FIG. 3. Only a single pawl 18 and a single protrusion 20 are depicted in FIG. 3, but it should be appreciated that the explanation that follows applies to every pawl-protrusion pair. When the cap assembly of FIG. 1 is removed from the filler tube, the radial surfaces 24 of the pawls 18 selectively engage the radial surfaces 28 of the protrusions 20 as shown in FIG. 3. When the control member 16 thus directly engages the closure member 12, relative rotation between the two members is not possible: there is no radial force applied to the cantilever pawl 18 to deflect it from the path of the protrusion 20. Accordingly, when the cap assembly is being removed from the filler tube, the clutch of the present invention does not limit the torque transmitted from the control member 16 to the closure member 12.

On the other hand, torque is limited when the cap assembly is placed on the filler tube: ramps 22 of the pawls 18 engage ramps 26 of the protrusions 20 when the cap assembly is screwed into the filler tube and the clutch is operative to allow relative rotation between the members 12 and 16. When the control member 16 thus engages the closure member 12, there is a radial component of force applied to the cantilever pawls 18 by the protrusions 20. When the torque applied to the manually graspable member 16 exceeds a predetermined level, the pawls 18 will deflect radially inward an amount sufficient to allow the pawls 18 to ride over the protrusions 20. As is evident from FIG. 2, after the pawls pass the protrusions, relative rotation between the members 12 and 16 is unimpeded for substantially 90° at which point the pawls 18 again engage protrusions 20; after 90° of rotation, of course, the pawls engage different protrustions. If the torque exceeding the predetermined maximum is sustained, the pawls 18 will be successively deflected by the protrusions 20 and 360° relative rotation will result.

As shown in FIG. 1, the closure member 12 is a generally tubular member. A radially extending flange 30 integral with the member 12 carries the pawls 18 spaced about the periphery of the flange. A retaining means 32 integral with the control member 16 retains the control member in assembly with the closure member.

A sealing means or O-ring seal 34 is disposed about the closure member 12 adjacent the flange 30 to provide a seal between the closure member 12 and the filler tube 10 to seal the volume or gas tank sealed by the cap assembly.

The cap assembly of the present invention includes valve means supported by the closure member 12 for allowing fluid flow through the tubular closure member. As shown in FIG. 1, the valve means includes an annular or radial support portion 36 and a cylindrical or axial support portion 38 both integral with the closure member 12. An annular seal 40 is disposed within the closure member 12 and carried by the radial support portion 36. A disk 42 having an annular ridge 43 normally engages the annular seal 40 under the influence of a biasing means comprising a spring 44 and a spring locator 46 comprising a disk 48 and an axially extending cone 50 engaging the control member 16. The biasing means urges the disk into a sealing relationship with the seal 40. The disk 42 is lifted from the seal in response to pressure build-up in the gas tank of the vehicle. The force of this built-up pressure is applied to the disk 42 in opposition to the force of spring 44 and the built-up pressure will lift the disk 42 from the seal 40 only if the built-up pressure exceeds the force of spring 44 plus the pressure of the atmopshere on the disk 42.

The disk 42 is provided with apertures 52 and a flapper valve 54 to permit fluid — air — to enter the sealed volume (the gas tank) through the cylindrical passage defined by the support portion 38. Thus air is permitted to enter the tank as gasoline is pumped out. This air is supplied through ventilation holes 56 and through a filter 58 disposed in the cylindrical passage defined by the support portion 38 and about the cone-shaped portion 50 of the spring locator 46.

Acetal resin can be used to make the closure member 12, the spring locator 46, and the disk 50. The manually graspable control member 16 can be fabricated from nylon. The seals 34, 40, and 54 can be neoprene.

Although the foregoing has proceeded in terms of a particular preferred embodiment, it is to be understood that various changes and modifications could be engrafted thereon by one skilled in the art within the spirit and scope of the appended claims.

The embodiments of the invention in which an exclusive property or privilege is claimed are defined as follows:

1. A gas cap assembly, comprising: a closure member having a threaded portion for threadedly engaging a threaded opening; a manually graspable control member; and a clutch having first and second coacting means one of which is integral with said closure member and the other of which is integral with said control member for allowing 360° relative rotation between said members in one direction in response to a predetermined torque yet preventing relative rotation between said members in the opposite direction.

2. An assembly as set forth in claim 1, wherein said first and second coacting means of said clutch comprise respectively at least one radially deflectable pawl and at least one protrusion having surfaces engagable with said pawl and wherein at least one of said first and second coacting means of said clutch includes a ramp effective to radially deflect said pawl in response to said predetermined torque.

3. An assembly as set forth in claim 2, including a plurality of pawls spaced circumferentially about and integral with said closure member.

4. An assembly as set forth in claim 3, including a plurality of protrusions spaced circumferentially about and integral with said control member.

5. An assembly as set forth in claim 4, wherein each pawl comprises a cantilever disposed generally circumferentially about said closure member including a ramp extending inwardly from the outer circumferential extremity thereof and a radial surface extending inwardly from said outer circumferential extremity.

6. An assembly as set forth in claim 5, wherein each protrusion includes a ramp disposed to selectively coact with said ramps of said pawls to deflect said pawls in response to said predetermined torque to thereby allow relative rotation between said members and a radial surface disposed to selectively coact with said radial surfaces of said pawls to prevent relative rotation between said members.

7. An assembly as set forth in claim 6, wherein said closure member includes a radially extending flange with said pawls spaced about the periphery of said flange and wherein said control member includes retaining means coacting with said flange for retaining said control member in assembly with said closure member.

8. An assembly as set forth in claim 7, including sealing means disposed about said closure member adjacent said flange.

9. An assembly as set forth in claim 8, wherein said closure member is generally tubular and wherein said cap assembly includes valve means supported by said closure member for allowing fluid flow through said tubular closure member.

10. An assembly as set forth in claim 9, wherein said closure member includes an annular support portion disposed radially thereof and wherein said assembly includes valve means carried by said annular support portion for controlling fluid flow through said tubular closure member.

11. An assembly as set forth in claim 10, wherein said valve means includes an annular seal, a disk, and biasing means urging said disk into sealing relationship with said seal yet allowing said disk to lift from said seal in response to a predetermined pressure within the volume sealed by said cap assembly.

12. An assembly as set forth in claim 11, wherein said disk has at least one aperture and wherein said valve means further includes a flapper valve to allow fluid flow through said aperture into the volume sealed by said cap assembly.

13. An assembly as set forth in claim 12, wherein said disk includes an annular ridge normally in sealing engagement with said annular seal.

14. An assembly as set forth in claim 13, wherein said biasing means includes a spring locator engaging said control member and a spring disposed between said spring locator and said disk urging said disk into sealing engagement with said seal.

15. An assembly as set forth in claim 14, wherein said spring locator comprises a disk and an axially extending cone engaging said control member.

16. An assembly as set forth in claim 15, wherein said valve means further includes a cylindrical passage for fluid through said tubular closure member and a filter disposed within said cylindrical passage and about said cone shaped portion of said spring locator.

17. An assembly as set forth in claim 16, wherein said valve means further includes at least one vent hole in said closure member to allow fluid flow to and from the volume sealed by said cap assembly.

18. An assembly as set forth in claim 1, including valve means supported by said closure member for selectively allowing fluid flow therethrough.

19. An assembly as set forth in claim 18, wherein said closure member includes an annular support portion disposed radially thereof and wherein said assembly includes valve means carried by said annular support portion for controlling fluid flow through said tubular closure member.

20. An assembly as set forth in claim 19, wherein said valve means includes an annular seal, a disk, and biasing means urging said disk into sealing relationship with said seal yet allowing said disk to lift from said seal in response to a predetermined pressure within the volume sealed by said cap assembly.

* * * * *